United States Patent Office 2,866,770
Patented Dec. 30, 1958

2,866,770

UREA-FORMALDEHYDE MODIFIED WITH POLYMERIZABLE MONOAMIDE CONTAINING OLEFINIC UNSATURATION AND PROCESS OF MAKING SAME

Jan Ide de Jong, Landenberg, Pa., assignor to E. I. du Pont de Nemours and Company, Wilmington, Del., a corporation of Delaware No Drawing. Application December 17, 1954
Serial No. 476,069

5 Claims. (Cl. 260—45.2)

This invention relates to a novel thermosetting resin which is suitable for use in laminates. More particularly, the invention is concerned with a modified urea-formaldehyde resin into which reactive olefinic groups have been introduced.

Several attempts have been made in the past to prepare glass fiber reinforced urea-formaldehyde resins which are suitable for use in various applications. The hydrophilic character of urea-formaldehyde resins has limited the utility of these resins in the form of glass fiber reinforced products. Moreover, one of the problems has been to delay excessive condensation until dry reinforced products were obtained. Other problems have arisen due to the fact that chemical dehydration accompanies the final curing reaction; for example, avoidance of excessive warping has been extremely difficult for this reason. Best results have been obtained in such processes by using a urea-formaldehyde condensation product which was modified with an amine, especially hexamethylene diamine. The function of the amine in these compositions was to delay the curing action of acid until the critical curing conditions (temperature, moisture content) were reached. In fact, when such amines have been used, compositions which contained only enough added acid to produce a neutral mixture could be dried, and cured at elevated temperatures with considerably improved results. It appears, however, that so long as the final curing takes place through the conversion of methylol groups to methylene bridges, water is invariably formed during the final cure, and excessive warping during the cure is quite difficult, or impossible, to avoid.

Various other methods of modifying urea-formaldehyde resin have also been disclosed. For example, amides of unsaturaed polycarboxylic acids have been employed for this purpose, but evidently no one has heretofore subjected the resulting products to conditions which would produce addition polymerization or copolymerization with other vinyl type compounds (cf. U. S. Patent 2,290,675).

An object of the present invention is to introduce into a urea-formaldehyde condensation product reactive olefinic groups, such as vinyl groups, and to further modify the resulting products by subjecting the resin to an addition reaction involving a peroxy compound or similar catalyst.

It has been discovered in accordance with this invention that monoamides containing at least one reactive olefinic group, and particularly those having terminal $>C=CH_2$ substitution, e. g. methacrylamide, upon reaction with N-methylol-containing condensation products of urea and formaldehyde, in the presence of an added acid, yield products which contain amido groups attached through methylene bridges to the remainder of the reaction product, said amido substituents containing reactive olefinic substitution, and that the resulting compositions can be further modified by polymerization or copolymerization in the presence of a catalyst which is capable of polymerizing vinyl compounds, e. g. an organic peroxide. The gelling of the said compositions can be inhibited by the use of an inhibitor for vinyl polymerization, e. g. hydroquinone. Removal of the inhibitor, where one has been added, reactives the polymer towards further polymerization or cross-linking. Moreover, styrene or other $>C=CH_2$ containing monomer may be added prior to such reactivation, and when this is done, the additional $>C=CH_2$ compound becomes incorporated in the final polymer by copolymerization. The $>C=CH_2$ polymerizations can be catalyzed by introducing a catalyst of the type which is used for polymerizing vinyl compounds, e. g. a peroxy or azo compound, preferably organic.

In the description given in the preceding paragraph it is to be understood that the styrene comonomer can be replaced by other $>C=CH_2$ compounds, especially those containing the substituent group $—CH=CH_2$ or $—C(alkyl)=CH_2$.

The urea-formaldehyde condensation products which are modified by reaction with methacrylamide or equivalent amide in accordance with the process of this invention, in particular embodiments, may be regarded as being methylol polymethylene polyureas. The latter products, in general, are linear compounds having urea residues bonded together with methylene groups there being present also in the chain at least one N-methylol group. Ordinarily, the gelling of urea-formaldehyde condensation products may take place by growth of the polymeric chain, accompanied by the formation of methylene bridges from side chain N-methylol substituents. In contrast with this, in the practice of the present invention, the N-methylol groups undergo reaction with an unsaturated amide as illustrated in the following equation:

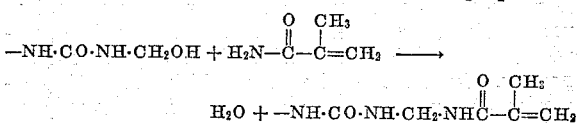

The products thus obtained contain unsaturated amido substitution, in place of the —N-methylol groups in the unmodified condensation product. Diamides cannot be used as modifiers in place of methacrylamide or other monoamides, because the diamides form units which are links along the polymer chain, rather than terminal methacrylamido groups.

The mole ratio of formaldehyde to urea in the condensation product which undergoes modification in accordance with the process of this invention has a significant effect upon the character of the product obtained. When this ratio exceeds about 1.7:1, the formation of uron rings along the chain occurs, at least to some extent. When this ratio is high, e. g. about 4:1, the chain is made up largely of uron rings.

If desired, in making the condensation product urea may be admixed with aqueous formaldehyde (ordinary formalin of 37% concentration being suitable), and the resulting mixture can be heated under refluxing conditions for a few minutes at a mildly alkaline pH to produce a mixture of products suitable for modification with the unsaturated amide. An excellent procedure is to start the reaction between urea and formaldehyde at a relatively high formaldehyde/urea mole ratio, e. g. 4:1 to 6:1, and to add the necessary additional amount of urea before, or simultaneously with, the addition of the unsaturated amide modifier. The reaction between the amide and the urea-formaldehyde condensation product is preferably carried out at a pH of 3 to 5 and a temperature of 80° to 100°. A suitable reaction time is 20 to 40 minutes. The condensation of the unsaturated amide with the urea-formaldehyde reaction product can be catalyzed by the addition of an organic acid; this can be a polymerizable organic acid which does not have to be removed from the final resin product. A suitable acid which gives satisfactory results in this connection is acrylic acid. The desired pH can be obtained by introducing about 1% to 1.5% of acrylic acid based upon the combined initial weight of urea and formaldehyde. To avoid polymerization of the unsaturated amide, or the urea-formaldehyde modified product, it is desirable to introduce into the reaction mixture a suitable quantity of polymerizable inhibitor, such as hydroquinone. The quantity of unsaturated amide which is employed is preferably about 0.3 to 0.5 mole per mole of urea in the urea-formaldehyde reaction product. While in certain embodiments it is permissible to convert the urea-formaldehyde condensation product to a viscous soluble material prior to reaction with the unsaturated amide (the bodying reaction being carried out in the presence of, for example, 0.002 mole of a strong acid, such as hydrochloric acid, per mole of urea initially present), it is frequently preferable to carry out the bodying step after the said reaction with the unsaturated amide.

To improve the compatibility of the resulting product with styrene, n-butanol or other similar alcohol reactant, or diluent, may be added. Under certain circumstances described hereinafter, N-methylol ether formation can occur during this step, preferably forming structural units of the formula —$CH_2OM$, wherein M is a hydrocarbon group which contains from 4 to 8 carbon atoms. The alcohol diluent, in any event, can serve as a means of removing water azeotropically, and can be employed in sufficient quantity to permit removal of all of the water in this manner.

In a preferred embodiment, distillation of alcohol-water azeotrope is contained until all of the water has been removed from the reaction mixture. The water-free solution thus obtained can be freed of alcohol in vacuo at a temperature of about 30° to 80° C. whereupon a solid residue is obtained in the form of a dry powder. In the embodiment in which the final polymerization or cross linking reaction is to take place through copolymerization with styrene or other comonomer, this powdery residue can be admixed with styrene, suitably with the aid of methanol. The resulting mixture can be polymerized as hereinafter described. When the resin is to be used for impregnation of glass cloth or glass fibers, the solution containing the modified urea-formaldehyde resin and styrene can be impregnated into the glass cloth or glass fibers prior to polymerization.

One of the surprising discoveries which is involved in the present invention is the anti-gelling action of the unsaturated amide modifier. Heating of urea-formaldehyde monomer having a formaldehyde/urea mole ratio of about 2 at a pH of about 4 in the absence of the amide modifier, results in gel formation in about 30 to 60 minutes (the degree of condensation, i. e. $CH_2$/urea mole ratio, being 0.92±0.03 at the gelling point). Use of a lower pH shortens this period to a few seconds. The addition of methacrylamide tended to prevent the formation of gel even when the heating was continued at a pH of 3 for 4 hours. Apparently, the ratio of methylene bridges between urea groups to urea groups ($CH_2$/urea) does not reach the critical value of 0.92 in the presence of a sufficient amount of methacrylamido substitution.

The reaction of the unsaturated amide with the N-methylol substituents is virtually complete under the conditions hereinabove disclosed. When the initial condensation products have both ends of the chain occupied by N-methylol groups, the methacrylamide modified products have both ends of the polymer chain terminated by the mono-functional methacrylamido groups.

Methacrylamide does not prevent gel formation in urea-formaldehyde products in which the formaldehyde/urea mole ratio is not above 1.7. While for the purposes of the present application the applicant does not wish to be bound by any theory as to the mechanism of gel formation, it is of interest to note that the fact that methacrylamide does not prevent gel formation when the formaldehyde/urea mole ratio is not above 1.7, can be explained as follows: When the formaldehyde/urea ratio is relatively low, the number of reactive primary amido hydrogens is higher than in those in systems with higher formaldehyde/urea ratios, and since gel formation occurs through reaction of methylol groups with amido hydrogens, gel formation would be faster at the relatively low formaldehyde/urea ratios and not enough methacrylamido groups could be introduced in time to prevent gel formation.

From the known structure of the polymethylene polyureas and their N-methylol derivatives and from the behavior of the amido substituted products, it can be deduced that, prior to dehydration, the ungelled urea-formaldehyde resins have a roughly linear structure at least when the unsaturated amide/urea mole ratio is within the range hereinabove indicated and when the formaldehyde/urea ratio is such that uron ring formation does not occur. Under these circumstances, when the amido groups are substituted at the ends of the chain, the following structure may be taken as representative:

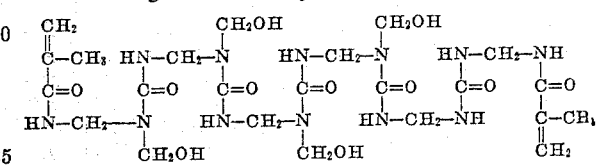

e. g. $(CH_2)Tot./U \sim 1.2$, $CH_2OH/U \sim 0.8$, $C=C/U \sim 0.4$

On the other hand, when the formaldehyde:urea mole ratio is 4 or higher, and particularly when the polyuron structure prevails, the corresponding formula can be illustrated as follows:

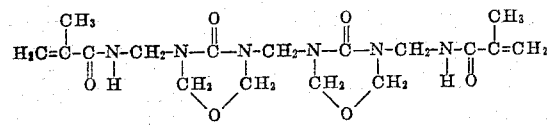

It is to be understood of course that when the formaldehyde:urea ratio is intermediate between that which is required for a non-uron structure and that which is required for the formation of many uron rings per molecule, the structure will be intermediate between these two extremes, i. e. the polymer will have a polymethylene polyurea structure, and will contain uron units as well, but the number of uron units, in proportion to the number of methylene-urea units, in the chain will be relatively small. For example uron rings are formed even at a formaldehyde:urea ratio as low as 1.8:1, but the linear N-methylol polymethylene polyurea structure as hereinabove illustrated is nevertheless prevalent.

Certain compositions of the character just described are not compatible with styrene. Good compatibility with styrene can be achieved, however, by dehydration, which in certain embodiments is accompanied by etherification of the residual N-methylol groups as hereinabove indicated. Under certain conditions, as herein indicated, this results also in uron ring formation. Preferably, the added alcohol is so chosen as to improve compatibility with such comonomer or comonomers as may later be added. Suitable alcohols which can be employed to impart or assist compatibility include methanol, ethanol, isopropanol, the butanols, octyl alcohol, furfuryl alcohol and benzyl alcohol. The lower alcohols, such as methanol, are useful primarily as solvents, rather than as agents which impart compatibility chemically. The best resins include those which are obtained with benzyl alcohol as the modifier, since this alcohol was found to be outstanding from a standpoint of imparting compatibility with styrene. Methanol was found to be advantageous in combination with a higher alcohol, such as benzyl alcohol; this was especially true in the manufacture of impregnating solutions. On the other hand, when it is desired to employ a resin solution of very high viscosity, it is advantageous to omit any excessive quantity of alcohol, and in such cases the methanol diluent can advantageously be omitted. A disadvantage which is inherent in the use of excessive amounts of relatively high boiling alcohols is the difficulty of removing the last traces of alcohol during the drying step. Obviously, some alcohols are disadvantageous from the standpoint of development of brownish color or undesirable odor. Alcohols which have these undesirable characteristics should be avoided in preferred embodiments.

With benzyl alcohol as the modifier and with styrene as the copolymerizable monomer (styrene content=20% by weight, based on the weight of the urea-formaldehyde-methacrylamide composition) using 1 to 1.5% by weight of benzoyl peroxide as the curing agent, a resin having the following properties was obtained: water absorption, 4.7%; dimensional change, 0.4%; heat distortion temperature (264 p. s. i.) 54° C.; effect of 1 hour boiling water cycle, none.

Glass cloth laminates were prepared by impregnating resorcylato-finished glass cloth with the methacrylamide modified alcohol-etherified resin admixed with styrene comonomer. The specific procedure employed in making these impregnated materials was essentially the same as in the illustrative examples which follow. It is to be understood, of course, that the modified resin can contain alpha-methyl styrene or other similar comonomer in place of styrene. The properties of the laminates are described in the following table:

teristic properties; for example, they tend to be flowable (semi-solid in general) even in the absence of diluents, such as alcohol. Theoretically, this fluidity or flowability is probably derived from the fact that their structure prevents hydrogen bonding. As hereinabove indicated, however, the invention is not limited by any such theory.

The invention is illustrated further by means of the following examples:

*Example I.—Preparation of Methacrylamide-Urea-Formaldehyde-Benzyl Alcohol-Styrene Resin Laminate (High Formaldehyde:Urea Ratio)*

To 100 ml. of a urea-formaldehyde concentrate, containing 85% solids (e. g. 0.55 moles urea and 2.7 moles formaldehyde, formaldehyde/urea=5), heated at 100° C. while stirring and refluxing, for ca. 20 minutes, 22 grams (0.26 mole) methacrylamide, 8 grams of urea (0.13 mole) and 100 milligrams hydroquinone are added. When all have dissolved, 0.5 ml. concentrated HCl is added and ca. 40 ml. $H_2O$ distilled off. A very thick slightly yellow oil is obtained. Residual $H_2O$ is removed by azeotropic distillation with 15 ml. benzyl alcohol (0.075 mole). When all water is removed, 1.0 ml. triethylamine is added for neutralization and excess benzyl alcohol is removed at high vacuum. Not all of the volatile material is removed, a semi-solid product being obtained. A very viscous mixture of this product with 30 grams styrene and 10 ml. diethylfumarate is prepared, admixed with 1.5% benzoyl peroxide and used for impregnating a resorcylato treated glass mat. Laminates obtained therefrom by pressing for 15 minutes at 80° C., followed by 30 minutes at 125° C. are found to be clear and to have compressive strengths of about 30,000 p. s. i.

GLASS CLOTH LAMINATES BONDED WITH METHACRYLAMIDE MODIFIED STYRENE COPOLYMERIZED UREA-FORMALDEHYDE RESINS

| Alcohol Added | $H_2O$ abs. (1 hr. boil), percent | Weight loss boil/dry | Compressive Strength, p. s. i. | Flexural Strength, p. s. i. | Flexural Modulus |
|---|---|---|---|---|---|
| 1. Benzyl Alcohol | 1.6 | 4% (1 hr.)— 12% (16 hr.). | 21,900 28,300 16,300 | 18,000 22,200 | 1.117 1.19 |
| 2. n-Butyl Alcohol | 4 | 6% (1 hr.)— 12% (16 hr.). | 20,600 | 55,000 38,000 39,000 | |
| 3. Methyl Alcohol | | | 19,100 26,600 | 46,000 | 2.6 |
| 4. Furfural | 1.2 | 26% (16 hr.) | 9,790 | 25,800 | 1.52 |

The mechanical properties of the resin laminates described in the foregoing table are about the same as those of polyester laminates. This is probably due to the fact that the mechanical properties are largely dependent upon the glass reinforcement. The water absorption and weight loss on boiling are, however, inferior to the corresponding properties of the polyester laminates although superior to the corresponding properties of other urea-formaldehyde laminates.

It is not essential that the etherfied resins hereinabove described be completely compatible with styrene. In fact, complete compatibility with styrene is generally not obtained.

In general, formation of uron rings requires subjecting a urea-formaldehyde condensation product having a formaldehyde/urea ratio of at least 1.8 and preferably at least about 2 to etherification conditions. Uron rings are thus formed at particular formaldehyde/urea ratios during the dehydration step hereinabove described. The uron ring-containing compositions have certain charac-

*Example II.—Preparation of methacrylamide-urea-formaldehyde-benzyl alcohol-styrene resin laminate (low formaldehyde:urea ratio)*

To 600 ml. neutralized 37% aqueous formaldehyde (pH equals about 8 to 9) is added 240 grams of urea, and the resulting mixture is heated with stirring under refluxing conditions for 5 to 10 minutes after which time 136 grams methacrylamide, 200 milligrams hydroquinone and 2 ml. hydrochloric acid (about 8% concentration) are added. The pH of the resulting mixture is 3. This mixture is refluxed for 20 minutes whereupon 300 ml. benzyl alcohol and 100 milligrams hydroquinone are added. Water is removed from the resulting mixture azeotropically with return of the benzyl alcohol layer to the distilling flask. About 400 ml. of distillate is removed during this dehydration step. To facilitate removal of water, 100 ml. n-butanol is added to the liquid mixture. After removal of the water, the reaction mixture is neutralized by the addition of 1 ml. of triethylamine so as to produce a pH of from 6 to 7. The product is then dried in vacuo at 60° to 80° C. under a pressure of 1 mm. In this manner, a dry powdered resin is obtained. To 100 grams of this dry powder, 70 ml. methanol and 40 ml. styrene are added, and the mixture is heated in a pressure bottle at 80° to 90° C. To the solution thus obtained is added 2.1 grams benzoyl peroxide and 5 ml. styrene, and glass mats are impregnated with the resulting composition. The impregnated mats are heated for from 6 to 10 minutes in an oven at 80° C. whereby the surface becomes dry. The dry mats are pressed for 15 minutes at 80° C. followed by 15 minutes at 120° C. Clear laminates are obtained in this way.

*Example III.—Preparation of methacrylamide-urea-formaldehyde-butal alcohol-styrene resin laminate*

A urea-formaldehyde-methacrylamide composition is prepared in the same manner as described in the preceding example. Instead of refluxing the mixture with benzyl alcohol, 500 ml. n-butanol is added, and the mixture is distilled for azeotropic removal of water, additional butanol being added in sufficient quantity to complete the removal of water from the composition. The resulting mixture is dried in vacuo at 40° to 60° C. and thereafter treated in the same manner as described in the preceding example. Clear laminates are obtained in this way.

*Example IV.—Preparation of acrylamide-urea-formaldehyde-styrene resin laminate*

To 150 ml. of neutralized (pH equals about 8) 37% aqueous formaldehyde is added 60 grams urea, and the resulting mixture is heated under refluxing conditions for from 5 to 10 minutes, thereupon 29 grams acrylamide is added, and the mixture is acidified by addition of 1 ml. acrylic acid. The acidified mixture is heated for 20 minutes under reflux, after which the pH is reduced to about 3 by the addition of 0.6 ml. of 8% aqueous hydrochloric acid. The heating is continued for an additional 20 minutes after which time about 100 ml. butanol is added, and the water in the mixture is removed azeotropically. After the removal of the water, the reaction is neutralized to a pH of about 7, and the neutralized product is vacuum dried at a temperature of 60° to 80° C. 100 grams of the dry powder thus obtained is admixed with 70 ml. methanol and 40 ml. styrene by heating the mixture in a pressure bottle at 80° to 90° C. To the resulting mixture is added 2.1 grams benzoyl peroxide and 5 ml. styrene. Glass mats are impregnated with this composition, and the impregnated mats are dried for about 10 minutes in an oven at 80° C. Following this, the dry mats are pressed for 15 minutes at 80° C. and 15 minutes at 120° C. Clear laminates are obtained in this manner.

As hereinabove indicated one of the difficulties which is encountered in the preparation of the above-described resins is the removal of the last traces of volatile components. Probably because the compositions illustrated in the examples contained uron rings, the melting point of the composition during drying was relatively low. Nevertheless, the last traces of volatile materials could not be removed without converting the thick liquid to a solid or semi-solid. The addition of various modifiers, such as alpha-terpineol, camphene, oleic acid, etc. to prevent solidification was tried, but in most cases there was not a sufficient reduction in viscosity of the modified polyuron-styrene mixture (except upon sacrifice in hydrophilic stability) to justify the addition of a modifier of this type. A few modifiers, such as diethyl fumerate, did produce a desirable lowering of the melting point without loss of stability.

Glass mat laminates were prepared by procedures substantially the same as those which were employed in making the glass cloth laminates. When the etherifying or dehydrating alcohol was benzyl alcohol (10% of the weight of resin), the flexural strength was 13,000 p. s. i. and the compressive strength was 29,000 p. s. i. With similar quantities of octyl alcohol and styrene respectively, the flexural strength was 19,000 p. s. i. and the compressive strength was 29,000 p. s. i.

The resin compositions of this invention are particularly useful in connection with the manufacture of glass laminates especially in those applications where improved hydrolytic stability and diminished hydrophilic character, as compared with unmodified urea formaldehyde, are desired.

What is claimed is the following:

1. A urea-formaldehyde reaction product comprising a polymethylene polyurea chain terminated by

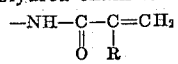

groups, copolymerized with a compound of the formula

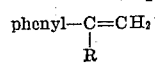

R being of the class consisting of —H and alkyl groups of from 1 to 4 carbon atoms, said product having —CH$_2$OM groups substituted on amido nitrogens, M being a hydrocarbon group having from 4 to 8 carbon atoms.

2. A urea-formaldehyde reaction product comprising a polymethylene polyurea chain terminated by

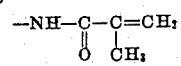

groups, copolymerized with styrene.

3. Process which comprises (1) preparing a resin intermediate which can be further polymerized in the presence of a peroxy compound as catalyst by heating aqueous polymethylene polyurea, having N-methylol substitution, said intermediate having a formaldehyde:urea mol ratio of 2:1 to 4:1, with an amide of the formula

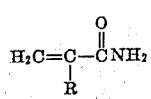

R being of the class consisting of hydrogen and alkyl groups, at a pH of 3 to 5, and a temperature of 90° to 100° C., whereby substantially all of the N-methylol groups are converted to

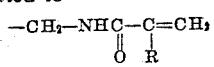

and uron groups, removing water from the resulting mixture, and (2) copolymerizing the resultant product with styrene in the presence of an organic peroxy compound.

4. Process of claim 3 wherein said amide is methacrylamide.

5. Process of claim 3 wherein the said water removal is accomplished by azeotropic distillation with benzyl alcohol and the said distillation is continued until the polymethylene polyurea chain in the said resin intermediate is partially converted to a polyuron.

References Cited in the file of this patent

UNITED STATES PATENTS 2,546,841    Wohnsiedler et al. _____ Mar. 27, 1951

FOREIGN PATENTS 482,897    Great Britain _____ Apr. 7, 1938